US009837866B2

(12) United States Patent
Moyer et al.

(10) Patent No.: US 9,837,866 B2
(45) Date of Patent: Dec. 5, 2017

(54) REDUCING POWER DISSIPATION IN INDUCTIVE ENERGY TRANSFER SYSTEMS

(71) Applicant: Apple Inc., Cupertino, CA (US)

(72) Inventors: Todd K. Moyer, Cupertino, CA (US);
Jeffrey M. Alves, Cupertino, CA (US);
Steven G. Herbst, Cupertino, CA (US);
David W. Ritter, Cupertino, CA (US);
Jeffrey J. Terlizzi, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 272 days.

(21) Appl. No.: 14/503,363

(22) Filed: Sep. 30, 2014

(65) Prior Publication Data

US 2015/0097443 A1    Apr. 9, 2015

Related U.S. Application Data

(60) Provisional application No. 61/888,598, filed on Oct. 9, 2013.

(51) Int. Cl.
H01F 27/42    (2006.01)
H01F 37/00    (2006.01)
H01F 38/00    (2006.01)
H02J 50/80    (2016.01)
H02J 5/00     (2016.01)
H02J 7/02     (2016.01)
H02J 17/00    (2006.01)

(52) U.S. Cl.
CPC .............. *H02J 50/80* (2016.02); *H02J 5/005* (2013.01); *H02J 7/025* (2013.01); *H02J 17/00* (2013.01)

(58) Field of Classification Search
CPC .. H02J 5/005; H02J 7/025; H02J 50/10; H02J 50/80
USPC ....................................................... 307/104
See application file for complete search history.

(56) References Cited

U.S. PATENT DOCUMENTS 5,157,319 A    10/1992   Klontz et al.
5,710,503 A    1/1998    Sideris et al.
5,742,148 A    4/1998    Sudo et al.
5,764,572 A    6/1998    Hammick
(Continued)

FOREIGN PATENT DOCUMENTS

CA    2489701    6/2006
CN    1653670    8/2005
(Continued)

OTHER PUBLICATIONS

Office Action dated Apr. 1, 2016, CN 201410648696.9, 9 pages.
(Continued)

*Primary Examiner* — Carlos Amaya
(74) *Attorney, Agent, or Firm* — Brownstein Hyatt Farber Schreck, LLP

(57) ABSTRACT

In an inductive energy transfer system, the phase of a signal that is applied to a transmitter coil to transfer energy is adjusted while energy is transferred from the transmitter device to a receiver device. The phase of the signal can be adjusted by changing a state of a DC-to-AC converter from a converting state to a non-converting state. The DC-to-AC converter outputs a signal that is applied to the transmitter coil when the DC-to-AC converter is in a converting state. A signal is not applied to the transmitter coil when the DC-to-AC converter is in a non-converting state.

21 Claims, 6 Drawing Sheets

(56) References Cited

U.S. PATENT DOCUMENTS

| | | |
|---|---|---|
| 5,821,731 A | 10/1998 | Kuki |
| 6,567,522 B1 | 5/2003 | Blackburn |
| 6,825,620 B2 | 11/2004 | Kuennen |
| 6,844,702 B2 | 1/2005 | Giannopoulos et al. |
| 6,885,529 B2 | 4/2005 | Ker et al. |
| 7,522,878 B2 | 4/2009 | Baarman |
| 7,560,902 B2 | 7/2009 | Unger |
| 7,605,496 B2 | 10/2009 | Stevens et al. |
| 7,760,101 B2 | 7/2010 | Ales, III et al. |
| 7,948,208 B2 | 5/2011 | Partovi et al. |
| 7,952,322 B2 | 5/2011 | Partovi et al. |
| 8,004,235 B2 | 8/2011 | Baarman |
| 8,115,420 B2 | 2/2012 | Morooka et al. |
| 8,129,864 B2 | 3/2012 | Baarman |
| 8,169,185 B2 | 5/2012 | Partovi et al. |
| 8,330,414 B2 | 12/2012 | Takahashi |
| 8,441,244 B2 | 5/2013 | Bianco et al. |
| 8,519,666 B2 | 8/2013 | Terao et al. |
| 8,531,153 B2 | 9/2013 | Baarman et al. |
| 8,629,652 B2 | 1/2014 | Partovi et al. |
| 8,629,654 B2 | 1/2014 | Partovi et al. |
| 8,890,470 B2 | 11/2014 | Partovi |
| 8,896,264 B2 | 11/2014 | Partovi |
| 8,901,881 B2 | 12/2014 | Partovi |
| 8,928,276 B2 | 1/2015 | Kesler |
| 8,933,594 B2 | 1/2015 | Kurs |
| 8,947,042 B2 | 2/2015 | Kirby et al. |
| 8,947,047 B2 | 2/2015 | Partovi et al. |
| 9,000,620 B2 | 4/2015 | Kim et al. |
| 9,018,898 B2 | 4/2015 | Ziv et al. |
| 9,087,638 B2 | 7/2015 | Oettinger |
| 9,106,083 B2 | 8/2015 | Partovi |
| 9,112,362 B2 | 8/2015 | Partovi |
| 9,112,363 B2 | 8/2015 | Partovi |
| 9,112,364 B2 | 8/2015 | Partovi |
| 9,178,369 B2 | 11/2015 | Partovi |
| 9,178,387 B2 | 11/2015 | Mohammadian et al. |
| 9,257,851 B2 | 2/2016 | Baarman |
| 9,276,437 B2 | 3/2016 | Partovi et al. |
| 9,356,659 B2 | 5/2016 | Partovi |
| 9,362,779 B2 | 6/2016 | Takahashi |
| 9,384,885 B2 | 7/2016 | Karalis et al. |
| 9,407,109 B2 | 8/2016 | Takahashi et al. |
| 9,496,733 B2 | 11/2016 | Van Funderburk |
| 9,496,793 B2 | 11/2016 | Bruwer et al. |
| 9,583,970 B2 | 2/2017 | Hsia et al. |
| 9,716,402 B2 | 7/2017 | Kirby |
| 2010/0084918 A1* | 4/2010 | Fells .............. H02J 5/005 307/32 |
| 2011/0050164 A1 | 3/2011 | Partovi et al. |
| 2011/0221385 A1 | 9/2011 | Partovi et al. |
| 2012/0068548 A1 | 3/2012 | Endo et al. |
| 2013/0093388 A1 | 4/2013 | Partovi |
| 2013/0099563 A1 | 4/2013 | Partovi et al. |
| 2013/0162051 A1 | 6/2013 | Michihata et al. |
| 2013/0260676 A1* | 10/2013 | Singh .............. H04B 5/0037 455/41.1 |
| 2013/0260677 A1 | 10/2013 | Partovi |
| 2013/0271069 A1 | 10/2013 | Partovi |
| 2013/0285604 A1 | 10/2013 | Partovi |
| 2013/0285605 A1 | 10/2013 | Partovi |
| 2013/0300204 A1 | 11/2013 | Partovi |
| 2014/0103873 A1 | 4/2014 | Partovi et al. |
| 2014/0132210 A1 | 5/2014 | Partovi |
| 2014/0191568 A1 | 7/2014 | Partovi |
| 2014/0306654 A1 | 10/2014 | Partovi |
| 2015/0061588 A1 | 3/2015 | Alves et al. |
| 2015/0130412 A1 | 5/2015 | Partovi |
| 2015/0137617 A1 | 5/2015 | Menzel et al. |
| 2015/0137750 A1 | 5/2015 | Kirby et al. |
| 2015/0194814 A1 | 7/2015 | Taylor et al. |
| 2015/0244341 A1 | 8/2015 | Ritter et al. |
| 2015/0303699 A1 | 10/2015 | Wagman et al. |
| 2016/0056662 A1 | 2/2016 | Yoon |
| 2016/0126775 A1 | 5/2016 | Park et al. |
| 2016/0134134 A1 | 5/2016 | Baarman et al. |
| 2017/0093218 A1 | 3/2017 | Hrinya et al. |
| 2017/0272058 A1 | 9/2017 | Menzel et al. |
| 2017/0288467 A1 | 10/2017 | Hrinya et al. |

FOREIGN PATENT DOCUMENTS

| | | |
|---|---|---|
| CN | 101621220 | 1/2010 |
| CN | 101902062 | 12/2010 |
| CN | 102934319 | 2/2013 |
| CN | 103427499 | 12/2013 |
| JP | H0767263 | 3/1995 |
| KR | 20100110356 | 10/2010 |
| KR | 1020130106840 | 9/2013 |
| WO | WO 2008/044875 | 4/2008 |
| WO | WO 2013/090565 | 6/2013 |
| WO | WO 2013/142720 | 9/2013 |

OTHER PUBLICATIONS

International Search Report and Written Opinion dated Dec. 15, 2014, PCT/US2014/059388, 9 pages.

"Benefits of Optical Communications," NASA, published May 6, 2014, accessed online Feb. 24, 2017, https://www.nasa.gov/directorates/heo/scan/engineering/technology/txt_opticalcomm_benefits.html, 3 pages.

Zhusheng et al., "Design and Application of Wireless Charging Technology for Electric Vehicle," Electric Age, May 31, 2012, vol. 5, pp. 26-28 (10 pages with translation).

"System Description Wireless Power Transfer," vol. I: Low Power, Part 1: Interface Definition, Version 1.0.1, Wireless Power Consortium, Oct. 2010, 86 pages.

"System Description Wireless Power Transfer," vol. I: Low Power, Part 1: Interface Definition, Version 1.1.1, Wireless Power Consortium, Jul. 2012, 247 pages.

Johns et al., "Designing a Qi-compliant receiver coil for wireless power systems, Part 1," Texas Instruments Incorporated, High-Performance Analog Products, Analog Applications Journal, www.ti.com/aaj, 3Q 2012, 9 pages.

* cited by examiner

REDUCING POWER DISSIPATION IN INDUCTIVE ENERGY TRANSFER SYSTEMS

CROSS-REFERENCE TO RELATED APPLICATIONS

This application claims the benefit under 35 U.S.C. §119(e) of U.S. Provisional Patent Application 61/888,598, filed on Oct. 9, 2013, entitled "Methods For Power Reduction In Inductive Charging Systems", the entirety of which is incorporated herein by reference as if fully disclosed herein.

TECHNICAL FIELD

The present invention relates generally to electronic devices, and more particularly to an inductive energy transfer system in an electronic device.

BACKGROUND

Many electronic devices include one or more rechargeable batteries that require external power to recharge from time to time. These devices may include cell phones, smart telephones, tablet computers, laptop computers, wearable devices, navigation devices, sports devices, health devices, accessory devices, and so on. Often, these devices are charged by connecting a charging cord to the electronic device and to an external power source (e.g., a wall outlet). The charging cord may be a cable having a connector with electrically conductive contacts that can mate with respective electrically conductive contacts of the electronic device. In some examples, electronic devices may use the received power to replenish the charge of an internal battery.

In some cases, the charging cord may be used exclusively for power transfer. In other cases, the charging cord may be used to transfer power alongside data. Examples of such connectors may include universal serial bus ("USB"), FireWire, peripheral component interconnect express ("PCIe"), or other similar data ports.

In many examples, a user may enjoy and regularly operate multiple electronic devices having internal batteries. These multiple devices often require separate charging cords having different power outputs and different connector types. Multiple charging cords can be burdensome to use, store, and transport from place to place. As a result, the benefits of device portability may be substantially limited.

Furthermore, charging cords may be unsafe to use in certain circumstances. For example, a driver of a vehicle may become distracted attempting to plug an electronic device into a vehicle charger. In another example, a charging cord may present a tripping hazard if left unattended.

To account for these and other shortcomings, some electronic devices may include an inductive charging system. A user may simply place an electronic device on an inductive charging surface to replenish the internal battery. A electromagnetic transmitter coil within the inductive charging surface may inductively couple to an electromagnetic receiver coil within the portable electronic device. By periodically toggling or alternating the current within the transmitter coil, a current may be induced in the receiver coil. The current induced in the receiver coil may be used to charge the internal battery of the portable electronic device.

However, in some situations, the current in the transmitter coil and/or in the receiver coil can produce a large amount of power or energy dissipation. When relatively small amounts of energy are transferred, energy dissipation can be large with respect to the amount of energy being transferred. Energy dissipation reduces the efficiency of the energy transfer and makes it difficult or time consuming to recharge the battery.

SUMMARY

In an inductive energy transfer system, the phase of a signal that is applied to a transmitter coil to transfer energy is adjusted while energy is transferred from the transmitter device to a receiver device. The phase of the signal can be adjusted by changing a state of a DC-to-AC converter from a converting state to a non-converting state. The DC-to-AC converter outputs a signal that is applied to the transmitter coil when the DC-to-AC converter is in a converting state. A signal is not input to the transmitter coil when the DC-to-AC converter is in a non-converting state.

In one aspect, a transmitter device in an inductive energy transfer system can include a DC-to-AC converter operably connected to a transmitter coil, and a controller operably connected to the DC-to-AC converter. The controller is configured to transmit one or more signals to the DC-to-AC converter to change a state of the DC-to-AC converter between a converting state and a non-converting state when the transmitter coil is transferring energy. As one example, the non-converting state may be a quiescent state. As another example, the non-converting state may be a high impedance state.

In another aspect, a method of operating a transmitter device in an inductive energy transfer system includes transferring energy using a transmitter coil in the transmitter device, and during the energy transfer, periodically changing a state of a DC-to-AC converter operably connected to the transmitter coil between a converting state and a non-converting state.

In another aspect, an inductive energy transfer system can include a transmitter device and a receiver device. The transmitter device can include a DC-to-AC converter operably connected to a transmitter coil, and a controller operably connected to the DC-to-AC converter. The receiver device may include a load operably connected to a receiver coil, and a sense circuit operably connected to the load to measure an operating condition of the load (e.g., a signal level on the load). The controller is configured to transmit one or more signals to the DC-to-AC converter to change a state of the DC-to-AC converter between a converting state and a non-converting state when the transmitter coil is transferring energy to the receiver coil. Additionally or alternatively, the sense circuit can transmit a control signal to the controller when the signal level on the load equals or is beyond (e.g., exceeds or is less than) a threshold. The controller can then place the DC-to-AC converter in a non-converting state based on the control signal received from the sense circuit. As one example, the sense circuit may transmit a control signal when the voltage level on the load equals or is less than a threshold, and the controller can place the DC-to-AC converter in a quiescent state based on the control signal received from the sense circuit.

In yet another aspect, a method of operating an inductive energy transfer system can include transferring energy from the transmitter device to the receiver device and measuring a signal level on a load in the receiver device during the transfer of energy. A determination may then be made as to whether the measured signal level equals or is beyond (e.g., exceeds or is less than) a threshold. If the signal level equals or is beyond the threshold, a signal can be transmitted from the receiver device to the transmitter device that indicates the signal level equals or is beyond the threshold. Based on the received signal, a controller in the transmitter device changing a state of a DC-to-AC converter to a non-converting state.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

DETAILED DESCRIPTION

Embodiments described herein can transfer energy more efficiently from a transmitter device to a receiver device in an inductive energy transfer system. Adjusting the phase of the signal applied to the transmitter coil can reduce the energy losses. Typically, a DC-to-AC converter operates in a converting state (i.e., current flows through the DC-to-AC converter 106) where a DC signal is converted to an AC signal. The present invention changes a state of a DC-to-AC converter from a converting state to a non-converting state continuously (e.g., on a per-cycle basis) and/or at select times. The DC-to-AC converter outputs a signal that is applied to the transmitter coil when the DC-to-AC converter is in a converting state. In a non-converting state, the DC-to-AC converter is not generating a signal that is applied to the transmitter coil.

In one example embodiment, phase-shifted full bridge (PSFB) phase control can be used to change the state of the DC-to-AC converter from a converting state to a quiescent state. In a quiescent state, energy is not transferred to the receiver device because the same potential is applied to the transmitter coil. The quiescent state allows the circulating currents to continue without adding energy to the system.

In another example embodiment, zero voltage switching (ZVS) can be used to change the state of the DC-to-AC converter from a converting state to a high impedance state. In the high impedance state, the parasitic capacitance of the transmitter coil absorbs the energy in the transmitter coil.

In another embodiment, pulse skipping may be used in combination with phase control to transfer energy more efficiently. With pulse skipping, an operating condition of the load in the receiver device (e.g., a signal level) is measured or detected and the state of the DC-to-AC converter is changed to a quiescent state if the signal is not a particular value or within a given operating range (e.g., is above a first value or is below a second value). As one example, if the voltage on the load is below a threshold, the DC-to-AC converter can be placed in the quiescent state, which in turn reduces the losses in the transmitter and receiver coils.

Figure 1:
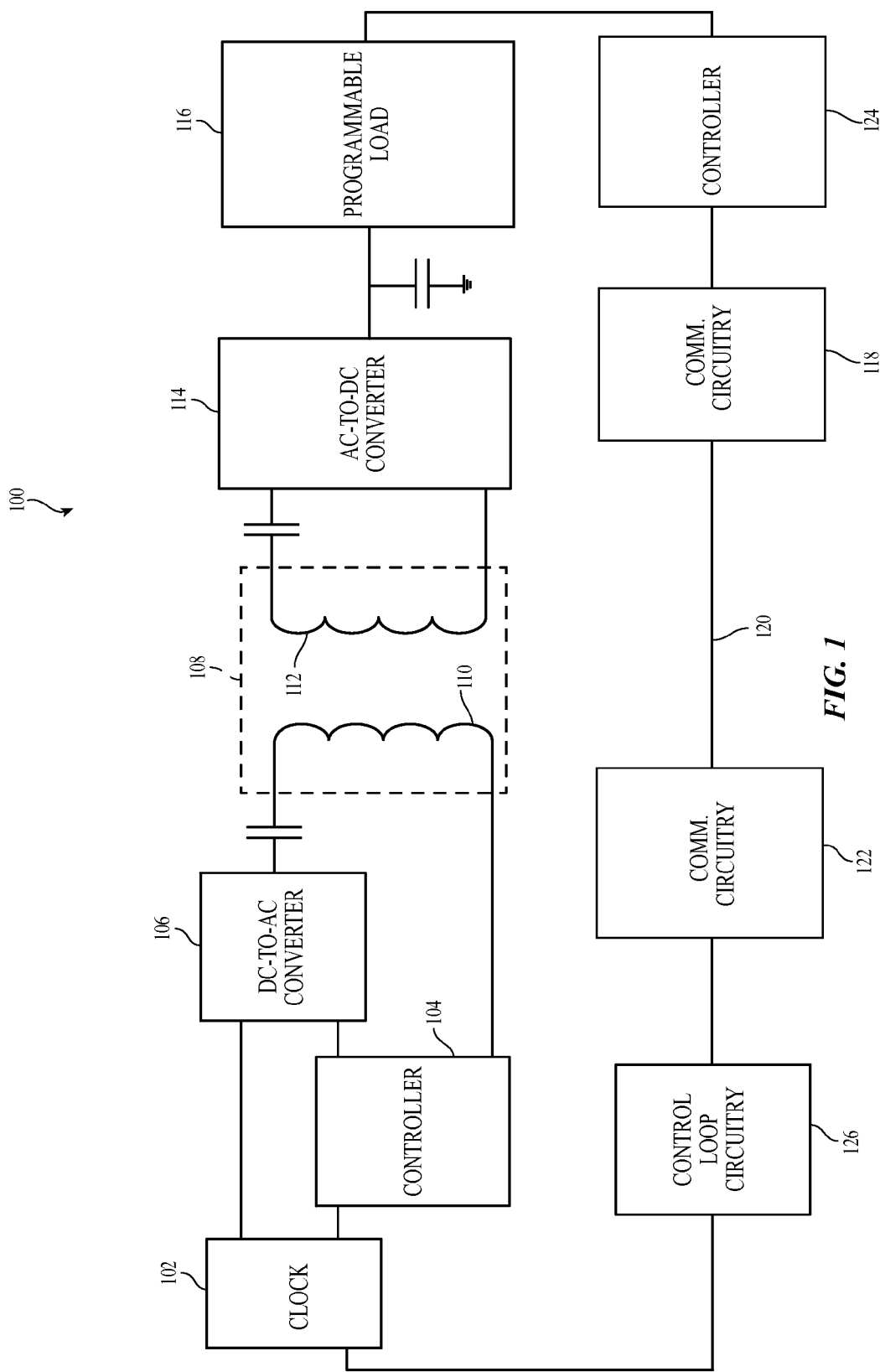
FIG. 1 is a simplified block diagram of a phase controlled inductive energy transfer system.

Referring now to FIG. 1, there is shown a simplified block diagram of a first phase controlled inductive energy transfer system. The embodiment shown in FIG. 1 operates at a fixed frequency while the phase of energy transfer is adjusted. The phrase "phase control" refers to the process of controlling the phase of the application of the signal on the transmitter coil of a transformer. The inductive energy transfer system 100 includes a clock circuit 102 operatively connected to a controller 104 and a DC-to-AC converter 106. The clock circuit 102 can generate the timing signals for a transmitter device in the inductive energy transfer system 100.

The controller 104 can control the state of the DC-to-AC converter 106. In one embodiment, the clock circuit 102 generates periodic signals that are used by the controller 104 to activate and deactivate switches in the DC-to-AC converter 106 on a per cycle basis. Any suitable DC-to-AC converter 106 can be used in the inductive energy transfer system 100. For example, in one embodiment, an H bridge is used as a DC-to-AC converter.

The AC signal produced by the DC-to-AC converter 106 is input into a transformer 108. The transformer 108 transfers energy through inductive coupling between a transmitter coil 110 and a receiver coil 112. Essentially, the AC signal in the transmitter coil 110 generates a varying magnetic field that induces a current in the receiver coil 112. The AC signal generated by the receiver coil 112 is received by an AC-to-DC converter 114 that converts the AC signal into a DC signal. Any suitable AC-to-DC converter 114 can be used in the inductive energy transfer system 100. For example, in one embodiment, a rectifier is used as an AC-to-DC converter.

The DC signal is then received by a load 116. In one embodiment, the load is a programmable load that includes a current source and a resistor connected in parallel. Alternatively, the load may include a current source when the load is a constant current load.

The clock circuit 102, the controller 104, the DC-to-AC converter 106, and the transmitter coil 110 are included in a transmitter device. The receiver coil 112, the AC-to-DC converter 114, and the programmable load 116 are included in a receiver device. Communication circuitry 118 in the receiver device is adapted to establish a communication channel 120 with communication circuitry 122 in the transmitter device. The communication channel 120 is used to convey information from the receiver device to the transmitter device, and vice versa. In one embodiment, the communication channel 120 can be implemented through inductive coupling between the transmitter and receiver coils. In other embodiments, the communication channel 120 may be implemented as a separate wired link or wireless link. In one embodiment, the communications channel 120 can be configured as any suitable wireless communication channel, such as, for example, a Bluetooth, Wi-Fi, cellular, or near-field communication channel.

A controller 124 in the receiver device is operatively connected to the load 116 and the communication circuitry 118. Although not shown in FIG. 1, the controller 124 can be operatively connected to other components in the receiver device. As one example, the controller may be operatively connected to the AC-to-DC converter 114, one or more sensors (not shown), a display (not shown), and a memory (not shown). The controller 124 can monitor and/or control the operations of the load 116, and may communicate the operating conditions of the load to the transmitter device through the communication channel 120. Additionally or alternatively, the controller 124 can request modifications in the operations of the transmitter device, such as an increase or decrease in the transfer of energy, through the communication channel 120.

Control loop circuitry 126 in the transmitter device can produce a control signal that is used to adjust the operations of the clock circuit 102. As described earlier, the clock circuit 102 generates periodic signals that are used by the controller 104 to activate and deactivate switches in the DC-to-AC converter 106. The control signal can cause the clock circuit 102 to modify the timing of the periodic signals that cause the controller 104 to activate and deactivate the switches in the DC-to-AC converter 106.

In some embodiments, the current in the transmitter and receiver coils 110, 112 can produce a large amount of power dissipation. When relatively small amounts of power are transferred, the power dissipation can be large with respect to the amount of energy being transferred. Additionally, the amount of loss is proportional to the load. The losses increase as the load on the transformer increases, and the losses decrease as the load on the transformer decreases. Typically, the losses drop to a threshold level when power is being transferred. In some embodiments, copper loss in the transmitter coil can determine the threshold level of loss.

Embodiments described herein transfer energy more efficiently by adjusting the phase of the signal that is applied to the transmitter coil. The state of the DC-to-AC converter is changed from a converting state to a non-converting state to introduce a delay in the application of the signal to the transmitter coil. In some embodiments, phase-shifted full bridge (PSFB) phase control or zero voltage switching (ZVS) can be used to adjust the phase of the signal applied to the transmitter coil. In another embodiment, pulse skipping is used individually or in combination with the phase control to adjust the phase of the signal applied to the transmitter coil.

In one embodiment, the DC-to-AC converter 106 may be implemented as an H bridge circuit. The descriptions of the PSFB and ZVS techniques are described in conjunction with an H bridge circuit. Other embodiments, however, can configure the DC-to-AC converter differently. In these embodiments, those skilled in the art will recognize that alternate techniques may be used to change the states of the DC-to-AC converter between converting and non-converting states.

Figure 2:
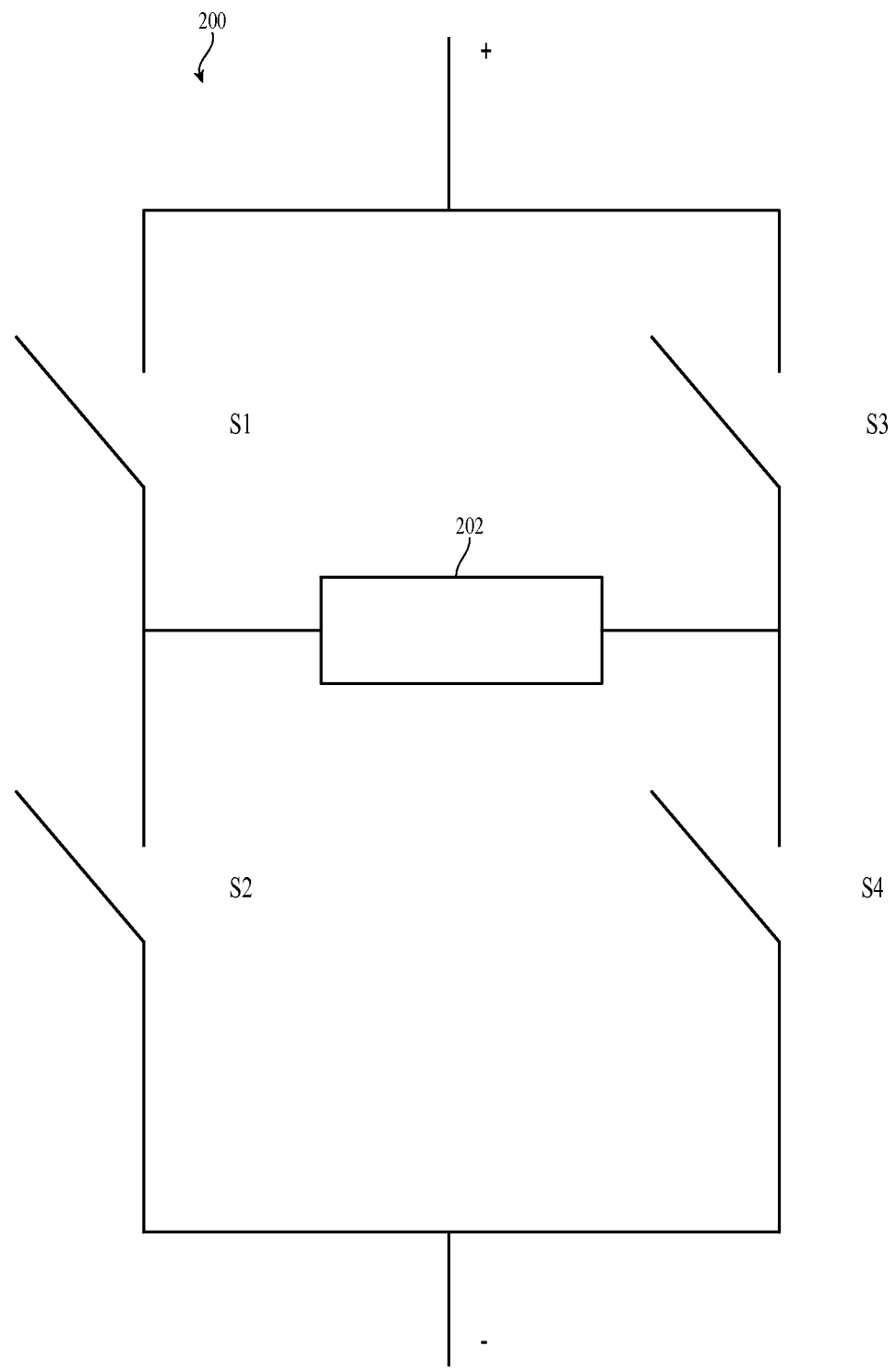
FIG. 2 is a simplified diagram of an H bridge suitable for use as a DC-to-AC converter 106 shown in FIG. 1.

FIG. 2 is a simplified diagram of an H bridge 200. The H bridge includes four switches S1, S2, S3, S4. Switches S1 and S2 are connected in series and form a first set of switches. Switches S3 and S4 are connected in series and form a second set of switches. The first set of switches is connected in parallel to the second set of switches. A load 202 is connected to the first set of switches between switches S1 and S2. The load is also connected to the second set of switches between switches S3 and S4. Any suitable type of switch can be used as switches S1, S2, S3, S4. For example, switches S1 and S3 can be p-channel MOSFET transistors or PNP biopolar transistors, and switches S2 and S3 can be n-channel MOSFET transistors or NPN biopolar transistors, respectively.

The controller 104 controls the closing and opening of the switches S1, S2, S3, S4. When switches S1 and S4 are closed for a given period of time and switches S2 and S3 are open, current flows from the positive terminal to the negative terminal through the load 202. Similarly, when switches S2 and S3 are closed for another given period of time while switches S1 and S4 are open, current flows from the negative terminal to the positive terminal. This opening and closing of the switches produces an AC current by repeatedly reversing the direction of the current through the load 202.

With phase control, both the PSFB and ZVS techniques may be implemented through the activation and deactivation of the switches in an H bridge circuit. In one embodiment, the activation and deactivation of the switches occurs on a per cycle basis. In the PSFB technique, the controller 104 in FIG. 1 can place the DC-to-AC converter 106 in four states instead of the two states described in conjunction with FIG. 2 (the two converting states). The switches are activated in a sequence with a quiescent state positioned between the two states associated with current flow through the DC-to-AC converter 106 that is received by the transmitter coil 110. Table 1 lists the state of the switches S1, S2, S3, S4 in the H bridge shown in FIG. 2 and the resulting four states of the converter 106 (states shown in an example sequence).

TABLE 1

| S1 | S2 | S3 | S4 | State of DC-to-AC Converter |
|---|---|---|---|---|
| closed | open | open | closed | current flows positive to negative (converting state) |
| closed | open | closed | open | quiescent state (non-converting state) |
| open | closed | closed | open | current flows negative to positive (converting state) |
| open | closed | open | closed | quiescent state (non-converting state) |

Energy is not transferred to the receiver coil, and therefore not input into the load 116 when the DC-to-AC converter 106 is in a quiescent state because the same potential is connected to both terminals of the transmitter coil. As discussed earlier, the quiescent states allow the circulating currents to continue without adding energy to the system.

The quiescent states introduces a delay or phase shift as to when switches are activated and deactivated, which in turn introduces a delay as to when the signal is input into the transmitter coil and the transformer. The duty cycle of applying energy to the transformer 108 and not applying energy to the transformer through the quiescent states can determine how much energy is input into the transformer and received by the load. Controlling the phase of energy application on the transformer can result in a more efficient energy transfer by reducing power dissipation.

With the ZVS technique, the controller 104 may place the DC-to-AC converter 106 in three states. The switches are activated in a sequence with a high impedance state positioned between the two states associated with the converting states (i.e., current flows through the DC-to-AC converter 106). Table 2 lists the state of the switches S1, S2, S3, S4 in the H bridge shown in FIG. 2 and the resulting states of the converter 106 (states shown in an example sequence).

TABLE 2

| S1 | S2 | S3 | S4 | State of DC-to-AC Converter |
|---|---|---|---|---|
| closed | open | open | closed | current flows positive to negative (converting state) |
| open | open | open | open | high impedance state (non-converting state) |
| open | closed | closed | open | current flows negative to positive (converting state) |
| open | open | open | open | high impedance state (non-converting state) |

When the H bridge is in the high impedance state, the body diodes in the H bridge can maintain current flow through the leakage inductance of the transmitter coil. In this embodiment, ZVS refers to delaying the activation (e.g. turning on) of a switch in the DC-to-AC converter until the voltage has transitioned from a prior voltage level to a given voltage level due to action of the load inductance, instead of using the switch itself to force the voltage transition. As such, before switch activation, energy is being delivered to the leakage inductance (partly) and to the load (partly), and after the switch is activated energy is released from the leakage inductance and at least a portion of the energy is delivered back to the DC power supply of the H bridge.

Figure 3:
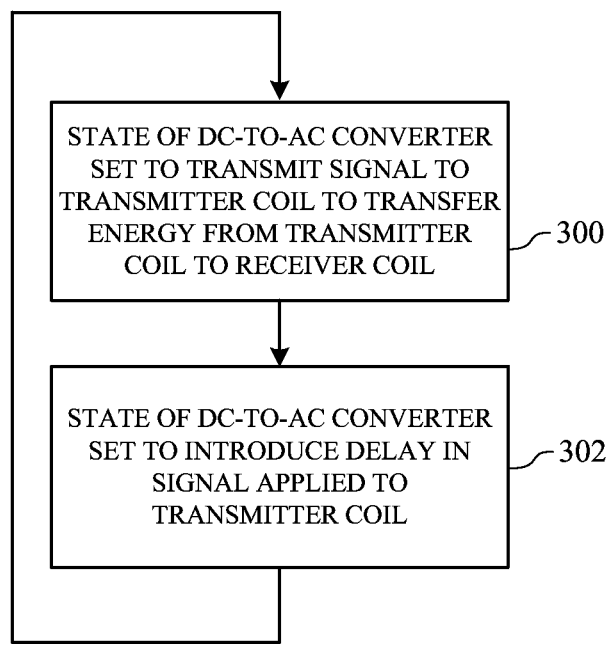
FIG. 3 is a flowchart of a method of operating the inductive energy transfer system shown in FIG. 1.

Referring now to FIG. 3, there is shown a flowchart of a method of operating the inductive energy transfer system shown in FIG. 1. Initially, as shown in block 300, the state of the DC-to-AC converter 106 is set to a converting state and a signal is transmitted to the transmitter coil 110 to transfer energy from the transmitter coil to the receiver coil. For example, the state of the DC-to-AC converter may be set so that current flows from the positive terminal to the negative terminal. The state of the AC-to-DC converter is then changed to a non-converting state to produce a delay in the application of the signal to the transmitter coil 110 (block 302). The state of the AC-to-DC converter can change to a quiescent state (see TABLE 1) or to a high impedance state (see TABLE 2).

In some embodiments, the process shown in FIG. 3 operates continuously while energy is transferred from the transmitter coil 110 to the receiver coil 112. Each time the method is performed, the current flowing through the transmitter coil 110 at block 300 changes direction. In particular, the current flows positive to negative in one operation and then flows negative to positive in the next operation. A quiescent or high impedance state occurs between each change in the current flowing state. For example, the switches can be activated and deactivated in the sequence shown in TABLE 1 or in TABLE 2.

Other embodiments can perform the method differently. As one example, the process can be performed at select times, such as when a small amount of energy is transferred from the transmitter device to the receiver device.

Figure 4:
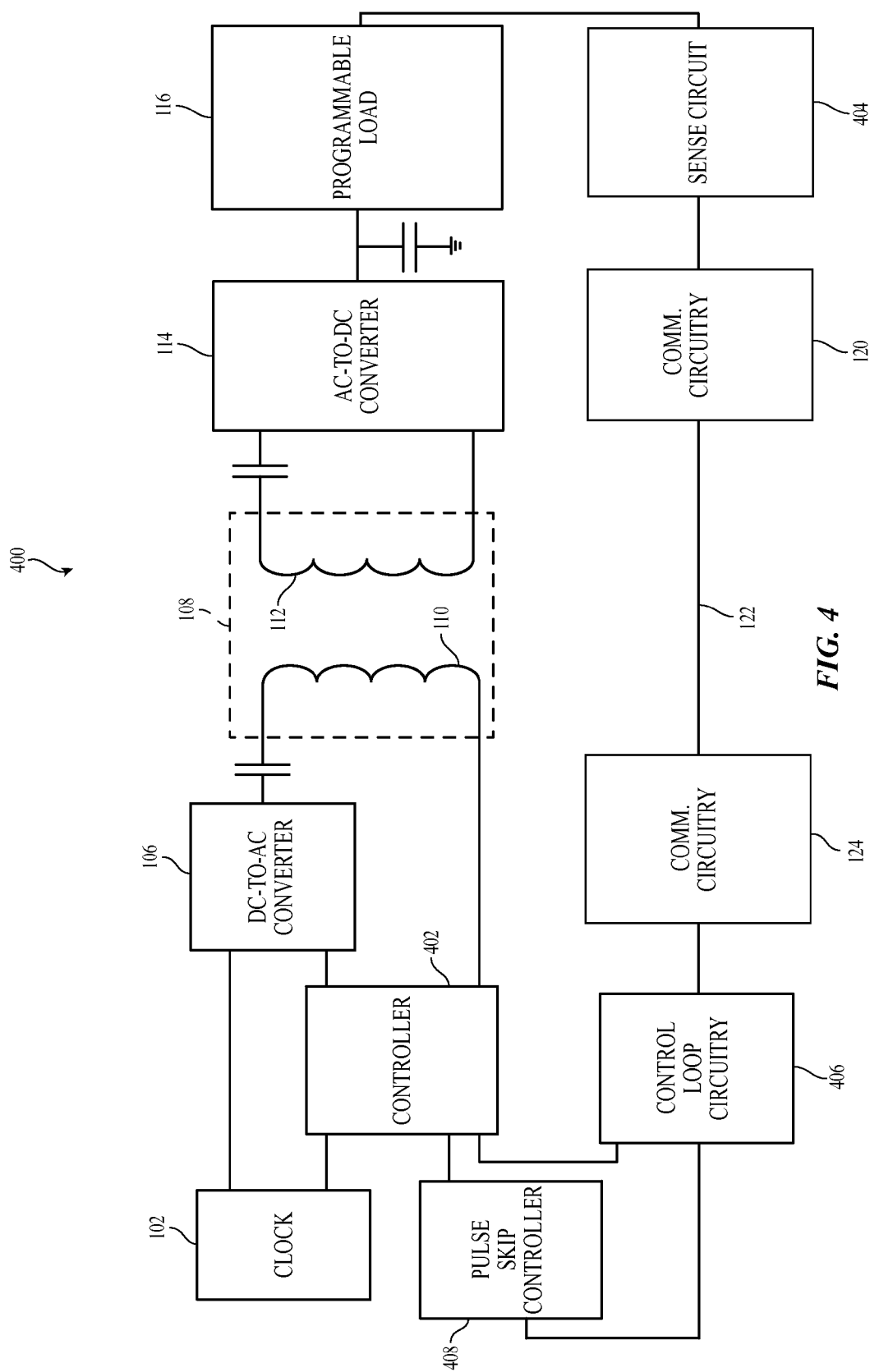
FIG. 4 is a simplified block diagram of a phase controlled inductive energy transfer system with pulse skipping.

Pulse skipping can increase the efficiency of energy transfer even more in some embodiments. FIG. 4 depicts a simplified block diagram of a phase controlled inductive energy transfer system with pulse skipping. The inductive energy transfer system 400 includes components that are similar to the components in the inductive energy transfer system 100 shown in FIG. 1, and like reference numbers have been used for these components. For simplicity and clarity, these components will not be described again.

The inductive energy transfer system 400 can transfer energy more efficiently by reducing power dissipation in the transformer. This can be particularly true for small power transfers. For example, some portable or wearable computing devices transfer less than 5 Watts of power. As one example, the amount of power transferred can be approximately 500 milliwatts. As another example, the amount of power transferred can be approximately 50 milliwatts.

The embodiment shown in FIG. 4 operates at a fixed frequency while the phase of power transfer by the transformer is adjusted. Additionally or alternatively, one or more signal pulses produced by the controller 402 to control the activation and deactivation of the switches can be skipped. When a signal pulse is to be skipped, the DC-to-AC converter 106 can be placed in a quiescent state that allows the circulating currents to continue without adding energy to the system.

In the illustrated embodiment, an operating condition such as a signal level (e.g., voltage level) on the load 116 is sensed by a sense circuit 404. The sense circuit may be included in the controller 124 shown in FIG. 1. The sense circuit 404 can be configured to determine if the signal level is at a given value or within a given operating range, equals or exceeds an upper threshold, or equals or is less than a lower threshold. If the value is not within the given operating range (e.g., equals or is less than the lower threshold), the sense circuit 404 can instruct the controller 402 to skip one or more control signals. The sense circuit 404 can transmit the instruction to the control loop circuitry 406 over the communication channel 120. A control signal produced by the control loop circuitry 126 is received by a pulse skip controller 408. In response to the control signal, the pulse skip controller 408 transmits a skip signal to the controller 402 that instructs the controller 402 to place the DC-to-AC converter 106 in a quiescent state. As one example, when the voltage on the load decreases to (or under) the lower threshold, the pulse skip controller 408 instructs the controller 402 to place the DC-to-AC converter in the quiescent state.

Figure 5:
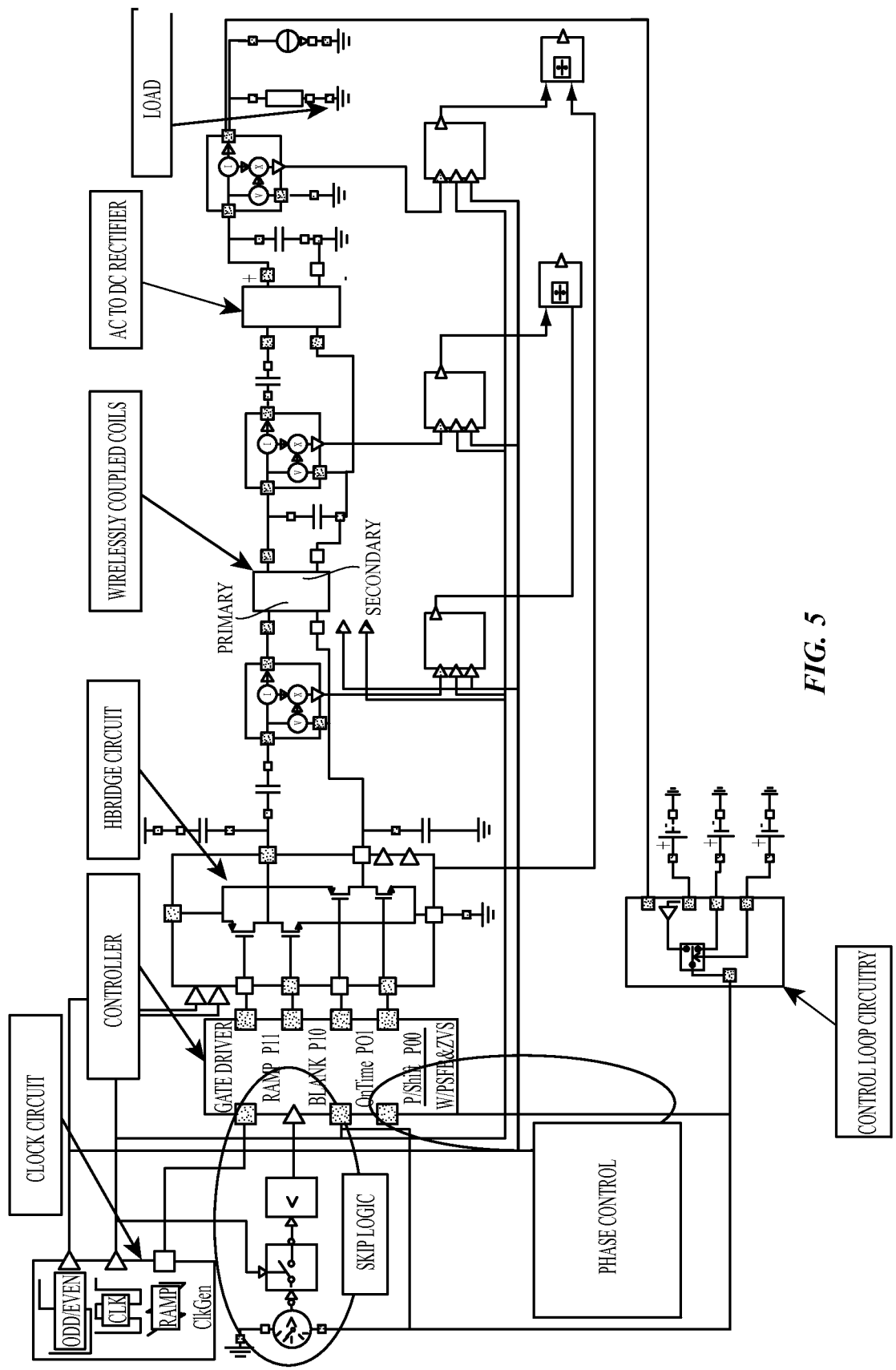
FIG. 5 is an example circuit diagram of the phase controlled inductive energy transfer system shown in FIG. 4.

FIG. 5 is an example circuit diagram of the phase controlled inductive energy transfer system shown in FIG. 4. The illustrated embodiment omits the sense circuit 404 and the communication circuitry 122 for simplicity. As described earlier, the clock circuit generates timing pulses that may control the operations of the transmitter device. The controller can include the gate driver logic or programming instructions ("gate driver logic") that control the state of the H bridge circuit. The clock circuit generates periodic signals that are used by the controller to activate and deactivate switches in the H bridge circuit on a per cycle basis.

The H bridge circuit is operably connected between the controller and the transmitter (primary) coil of the transformer ("wirelessly coupled coils"). The control loop circuitry 406 is operably connected to the controller 402. The controller ("gate driver logic") includes signals that control the phase ("phase control") of the signals output from the H bridge circuit. The pulse skip controller includes the skip logic or program instructions ("skip logic") that produce a skip signal that is received by the controller, which in turn causes the controller to transmit a signal or signals that causes the H bridge circuit to be set to a quiescent state.

Figure 6:
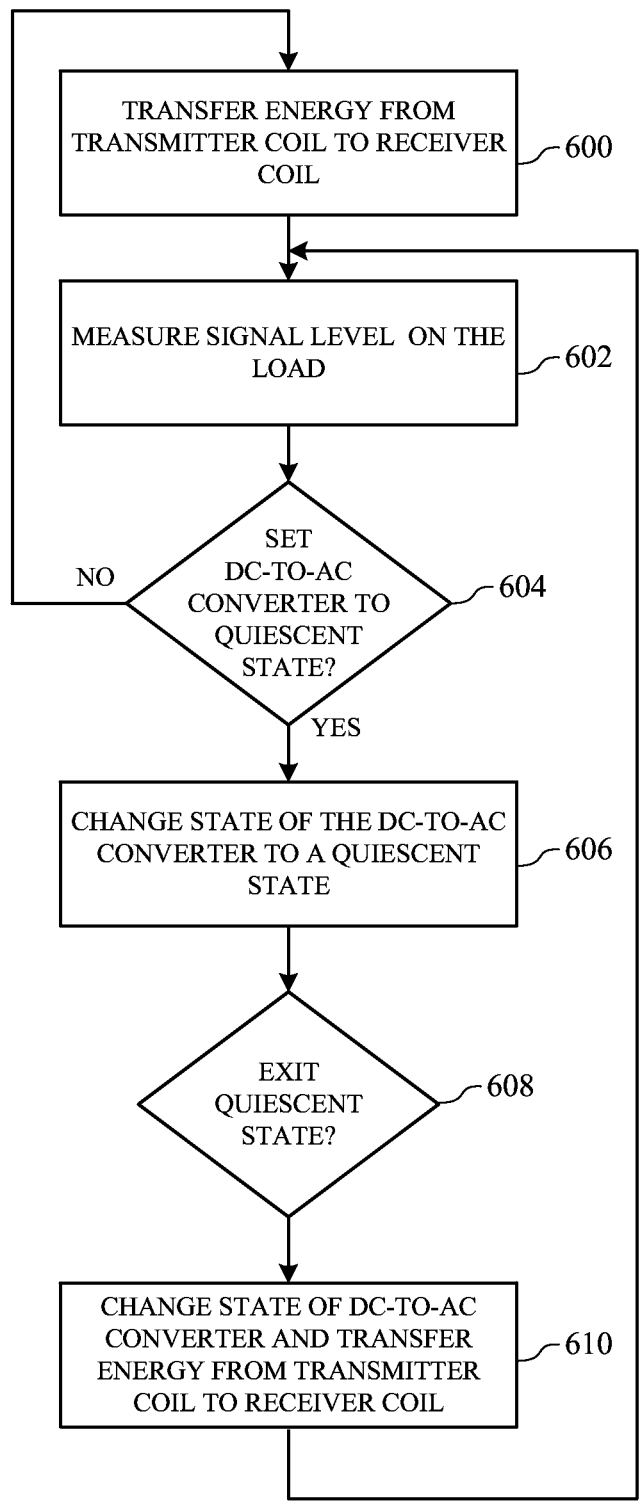
FIG. 6 is a flowchart of a method of operating the inductive energy transfer system shown in FIG. 4.

Referring now to FIG. 6, there is shown a flowchart of a method for operating an inductive energy transfer system. Initially, the inductive energy transfer system is operating and the transmitter coil is transferring energy to the receiver coil (block 600). An operating condition of the load, such as a signal level (e.g., voltage level) can be measured at block 602. A determination may then be made at block 604 as to whether the signal level equals or is beyond (e.g., exceeds or is less than) a threshold and the DC-to-AC converter is to be placed in a quiescent state. As described earlier, a signal level on the load may be measured to determine if the signal level is within a given operating range, is greater than an upper threshold, or is less than a lower threshold. If the measures signal equals or is beyond a threshold (either upper or lower threshold), the controller 402 can place the DC-to-AC converter in a quiescent state.

If the DC-to-AC converter will not be placed in a quiescent state, the process returns to block 600. If the DC-to-AC converter will be placed in a quiescent state, the method passes to block 606 where the state of the DC-to-AC converter is changed to the quiescent state. In one embodiment, a skip signal may be transmitted to the controller, which in turn causes the controller to change the state of the DC-TO-AC converter to the quiescent state.

A determination can then be made at block 608 as to whether the state of the DC-to-AC converter is to be changed from the quiescent state to a converting state. The amount of time the DC-TO-AC converter is in the quiescent state can be a fixed amount of time or a variable amount of time. As one example, the length of the quiescent state may be based at least in part on the magnitude of the signal level measured on the load at block 602.

The process waits at block 608 if the state of the DC-to-AC converter will not be changed. If the state will change, the method continues at block 610 where the state of the DC-to-AC converter is changed to a converting state and energy is transferred from the transmitter coil to the receiver coil. The process then returns to block 602.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

What is claimed is:

1. A transmitter device for an inductive energy transfer system, comprising:
   a DC-to-AC converter operably connected to a transmitter coil; and
   a controller operably connected to the DC-to-AC converter and configured to transmit one or more signals to the DC-to-AC converter to change a state of the DC-to-AC converter between a converting state and a non-converting state when the transmitter coil is transferring energy, the non-converting state comprising a quiescent state in which the DC-to-AC converter electrically couples a first and second lead of the transmitter coil.

2. The transmitter device as in claim 1, further comprising a clock circuit operably connected to the controller.

3. The transmitter device as in claim 2, further comprising control loop circuitry operably connected to the clock circuit and configured to adjust the operations of the clock circuit.

4. The transmitter device as in claim 3, further comprising communication circuitry operably connected to the control loop circuitry.

5. The transmitter device as in claim 1, further comprising a pulse skip controller operably connected to the controller and configured to transmit a skip signal to the controller to cause the controller to change the state of the DC-to-AC converter from a converting state to a non-converting state.

6. The transmitter device as in claim 1, wherein the DC-to-AC converter comprises an H bridge circuit.

7. The transmitter device as in claim 6, wherein the controller is configured to change the state of the H bridge circuit between the converting state and the non-converting state by alternately placing the H bridge circuit in a converting state and in the quiescent state.

8. The transmitter device as in claim 6, wherein the controller is configured to change the state of the H bridge circuit between the converting state and the non-converting state by alternately placing the H bridge circuit in a converting state and in a high impedance state.

9. An inductive energy transfer system, comprising:
   a transmitter device, comprising:
      a DC-to-AC converter operably connected to a transmitter coil; and
      a controller operably connected to the DC-to-AC converter; and
   a receiver device, comprising:
      a load operably connected to a receiver coil; and
      a sense circuit operably connected to the load to measure a signal level on the load, wherein the controller is configured to transmit one or more signals to the DC-to-AC converter to change a state of the DC-to-AC converter between a converting state and a non-converting state when the transmitter coil is transferring energy to the receiver coil, the non-converting state comprising a quiescent state in which the DC-to-AC converter electrically couples a first and second lead of the transmitter coil.

10. The inductive energy transfer system as in claim 9, further comprising:
    first communication circuitry operably connected to the sense circuit; and
    second communication circuitry operably connected to the controller, wherein the first communication circuitry and the second communication circuitry are configured to establish a communication channel between the transmitter and receiver devices.

11. The inductive energy transfer system as in claim 10, wherein the DC-to-AC converter comprises an H bridge circuit.

12. The inductive energy transfer system as in claim 11, wherein the controller is configured to change the state of the H bridge circuit between the converting state and the non-converting state by alternately placing the H bridge circuit in a converting state and in the quiescent state.

13. The inductive energy transfer system as in claim 11, wherein the controller is configured to change the state of the H bridge circuit between the converting state and the non-converting state by alternately placing the H bridge circuit in a converting state and in a high impedance state.

14. The inductive energy transfer system as in claim 11, wherein the sense circuit is configured to transmit a control signal to the controller over the communication channel when the signal level equals or is beyond a threshold to cause the controller to place the H bridge circuit in a quiescent state.

15. A method of operating a transmitter device in an inductive energy transfer system, the method comprising:
    transferring energy using a transmitter coil in the transmitter device; and
    during energy transfer, periodically changing a state of a DC-to-AC converter operably connected to the transmitter coil between a converting state and a non-converting state, the non-converting state comprising a quiescent state in which the DC-to-AC converter electrically couples a first and second lead of the transmitter coil.

16. The method as in claim 15, wherein the DC-to-AC converter comprises an H bridge circuit and the state of the H bridge circuit changes between the converting state and the non-converting state by activating and deactivating switches in the H bridge circuit.

17. The method as in claim 16, wherein the activating and deactivating switches in the H bridge circuit alternately places the H bridge circuit in a converting state and in a quiescent state.

18. The method as in claim 16, wherein the activating and deactivating switches in the H bridge circuit alternately places the H bridge circuit in a converting state and in a high impedance state.

19. A method of operating an inductive energy transfer system that includes a transmitter device and a receiver device, the method comprising:
- transferring energy from the transmitter device to the receiver device;
- measuring a signal level on a load in the receiver device during the transfer of energy;
- determining if the signal level equals or is beyond a threshold;
- if the signal level equals or is beyond the threshold, transmitting a signal from the receiver device to the transmitter device that indicates the signal level equals or is beyond the threshold; and
- based on the received signal, a controller in the transmitter device changing a state of a DC-to-AC converter to a non-converting state comprising a quiescent state in which the DC-to-AC converter shorts a transmitter coil of the transmitter device.

20. The method as in claim 19, wherein determining if the signal level equals or is beyond a threshold comprises determining if the signal level is equal to or less than a threshold.

21. The method as in claim 19, wherein the DC-to-AC converter comprises an H bridge circuit and the state of the H bridge circuit changes to the non-converting state by placing the H bridge circuit in the quiescent state.

\* \* \* \* \*